United States Patent
Botargues et al.

(10) Patent No.: US 8,467,917 B2
(45) Date of Patent: Jun. 18, 2013

(54) AUTOMATIC MANAGEMENT METHOD AND DEVICE OF A LATERAL TRAJECTORY FOR AN EMERGENCY DESCENT OF AN AIRCRAFT

(75) Inventors: Paule Botargues, Toulousse (FR); Erwin Grandperret, Blagnac (FR); Lucas Burel, Blagnac (FR); Jacques Rosay, Toulouse (FR); Didier Ronceray, Pibrac (FR)

(73) Assignees: Airbus (S.A.S.), Blagnac Cedex (FR); Airbus Operations (S.A.S.), Toulouse Cedex (FR)

( * ) Notice: Subject to any disclaimer, the term of this patent is extended or adjusted under 35 U.S.C. 154(b) by 138 days.

(21) Appl. No.: 13/184,123

(22) Filed: Jul. 15, 2011

(65) Prior Publication Data
US 2012/0022724 A1 Jan. 26, 2012

(30) Foreign Application Priority Data
Jul. 20, 2010 (FR) ...................................... 10 55892

(51) Int. Cl.
*G05D 1/00* (2006.01)
(52) U.S. Cl.
USPC .................................. 701/5; 701/11; 340/976
(58) Field of Classification Search
USPC ...................... 701/3, 5, 9, 11, 14, 18; 340/976
See application file for complete search history.

(56) References Cited

U.S. PATENT DOCUMENTS

| 4,314,341 | A | 2/1982 | Kivela | |
|---|---|---|---|---|
| 7,925,394 | B2* | 4/2011 | Deker et al. | 701/18 |
| 8,306,678 | B2* | 11/2012 | Fleury et al. | 701/9 |
| 2007/0088492 | A1* | 4/2007 | Bitar et al. | 701/120 |

(Continued)

FOREIGN PATENT DOCUMENTS

| FR | 2894367 | 6/2007 |
|---|---|---|
| FR | 2906921 | 4/2008 |
| FR | 2928465 | 9/2009 |
| FR | 2939883 | 6/2010 |

OTHER PUBLICATIONS

"EUR Regional Supplementary Procedures (SUPPS) (Doc 7030) Working Copy—5th Edition—2008," International Civil Aviation Organization, Jan. 4, 2010, pp. 1-2, XP002622599, http://www.paris.icao.int/documents_ope/show_file.php?id=240 Chapter 9.1.

(Continued)

*Primary Examiner* — Helal A Algahaim
(74) *Attorney, Agent, or Firm* — Wood, Herron & Evans, LLP

(57) ABSTRACT

A method for automatically managing a lateral trajectory upon triggering an emergency descent includes determining a value of lateral offset and generating an offset setpoint by using the value of lateral offset. The generating an offset setpoint includes calculating a sum of the value of lateral offset and any initial value of lateral offset defined between a central axis of a protected sector that the aircraft travels along and an initial lateral trajectory. The offset setpoint is selected to be the smaller of the sum or a lateral offset maximum, which maintains the aircraft within the protected sector at all times. The aircraft is then operated to move the aircraft to the offset setpoint during the emergency descent, which helps avoid further air traffic that may be located at different altitude levels within the same protected sector, especially along the central axis.

14 Claims, 2 Drawing Sheets

U.S. PATENT DOCUMENTS

| | | | |
|---|---|---|---|
| 2008/0177432 A1* | 7/2008 | Deker et al. | 701/17 |
| 2008/0306680 A1* | 12/2008 | Marty et al. | 701/201 |
| 2008/0312777 A1* | 12/2008 | Dey et al. | 701/3 |
| 2009/0228161 A1 | 9/2009 | Botargues et al. | |
| 2010/0168936 A1* | 7/2010 | Caillaud et al. | 701/5 |

OTHER PUBLICATIONS

French Patent Office, International Search Report FR 1055892 (2 pgs.), Feb. 15, 2011.

* cited by examiner

AUTOMATIC MANAGEMENT METHOD AND DEVICE OF A LATERAL TRAJECTORY FOR AN EMERGENCY DESCENT OF AN AIRCRAFT

TECHNICAL FIELD

The present invention relates to a method and a device for automatically managing a lateral trajectory of an aircraft, in particular a transport airplane, upon an emergency descent.

The solution relates to an automated emergency descent device and, more particularly, to managing the lateral trajectory of the aircraft upon the latter.

BACKGROUND

As known, civil transport airplanes should be pressurized, as upon a cruise flight, an airplane flies at an altitude being often higher than 30,000 feet (about 9,000 meters), for which the external air is too low in oxygen (and also too cold and too dry) for being compatible with life. Thus, pressurizing systems are provided in airplanes for keeping on board a breathable atmosphere. In particular, the international aeronautic regulation states that any public transport airplane flying at an altitude higher than 20,000 feet (about 6,000 meters) should be pressurized and that it should establish in the cockpit an equivalent altitude which does not exceed 8,000 feet (about 2,400 meters) upon a normal flight.

It may however occur that, as a result of a breakdown or a failure, the pressurization of the airplane could no longer be maintained at an acceptable level. A regulatory procedure then compels the pilot to have the airplane descent, as quickly as possible, at a breathable altitude of 10,000 feet (about 3,000 meters) or at the current security altitude if it is not possible to descent as low as 10,000 feet because of the relief. Such a procedure is referred to as an emergency descent.

In such a case, the crew is responsible for different tasks related to initiating the descent, as well as the adjustment of parameters of the descent (speed, target altitude, lateral trajectory, etc.) and this until the airplane flies level at low altitude.

When a crew, as a result of the cockpit becoming decompressed or any other event, carries out an emergency descent, they are requested to deviate from the centre of the air traffic way it followed before the event occurred. Such a measure aims at avoiding that, upon the emergency descent, the aircraft comes into conflict with aircrafts flying along the same air traffic way at lower flight levels. Such an operational requirement is explicitly mentioned in document 7030 of the Civil Aviation International Organization, stipulating that the aircraft having to carry out an emergency descent should deviate from its initial itinerary before starting to descent.

As most of the aircrafts are not provided with automatic systems for carrying out an emergency descent, the whole tasks to be carried out remain the responsibility of the crew, and amongst them, the requirement of deviating from the central axis of the air traffic way upon the initiation of the maneuver. Such a deviation maneuver generally results for the crew in a reflex action via the heading selector of the autopilot. Such an action results in quickly slaving the autopilot on a new heading setpoint, diverging with respect to the initially followed itinerary.

It could happen, however, that in the case of a pressurization loss as a result of which the crew have lost conscience (hypoxia symptoms), the crew is no longer able to apply the above described procedure.

In order to overcome such situations, the emergency descent procedure could be automated.

In particular, from document FR-2,928,465, a particular method is known for automatically controlling an emergency descent of an aircraft. According to this method, when an emergency descent automatic function is triggered, the following successive operations are carried out:

a) a set of vertical setpoints is automatically determined comprising:
   a target altitude representing an altitude to be reached by the aircraft at the end of the emergency descent; and
   a target speed representing a speed that the aircraft should respect upon the emergency descent;

b) a set of lateral setpoints is automatically determined, representing a lateral maneuver to be carried out upon the emergency descent; and c) the aircraft is automatically guided so that it simultaneously respects said set of vertical setpoints and said set of lateral setpoints until reaching said target altitude that it subsequently maintains, said automatic guidance being able to be interrupted by an action of the pilot of the aircraft.

As far as the management of the lateral trajectory within the context of an automated emergency descent is concerned, the following is known:

from document U.S. Pat. No. 4,314,341, an automated emergency descent to a security altitude. In the case of an emergency descent, this document provides automatically applying a rolling setpoint for a predetermined period of time, followed by folding the wings of the airplane flat. Such a maneuver allows to systematically carry out, in the case of an automated emergency descent, a turn with a defined number of degrees (to the left or to the right) and to deviate from the initial itinerary. If this latter maneuver does allow to deviate from the initially followed air traffic way, it could, for instance, guide the airplane in distress toward an area where no deviation ground is available for allowing a landing or toward an area where the relief is more hilly (higher security altitudes), or even toward air spaces wherein aircrafts are not allowed to fly over or even toward air spaces where the traffic is even denser, which is obviously not wanted when the crew is unconscious (hypoxia); and from document FR-2,906,921, a method for generating a 3D emergency trajectory for an aircraft, being applicable more specifically to situations requiring an emergency descent to be carried out. The device as described in this document allows to create, in addition to a trajectory in the vertical plane, a lateral trajectory leading to the destination of the flight, taking into account relief and performance constraints. Such a solution, however, requires having available, more specifically, perfectly integrated and reliable data bases of the ground (which is not the case currently). It additionally seems particularly tedious and difficult to be industrially contemplated, with respect to the objective to be achieved, that is allowing an airplane to quickly and perfectly safely reach an altitude, at which the occupants of the airplane are able to autonomously breath and without any additional oxygen supply, and allowing a crew that would initially lost conscience to regain conscience so as to ensure the flight to continue until landing on an airport.

Furthermore, the urgent character of situations leading to implementing an emergency descent does not allow the crew to carry out modifications of the active flight itinerary, via the interface of the flight management system, upon the initiation of the emergency descent. Indeed, such modifications would take some time and require a particular attention from the crew.

Now, managing the lateral trajectory, along which the emergency descent is carried out, shows to be a particularly important element and should more specifically allow:
- to minimize the risks of collision with aircrafts likely to fly at lower altitudes on the same air traffic way;
- to take into account different flight constraints, being considered by the crew until that point (avoidance of areas of turbulences or dangerous meteorological phenomena);
- to stay within the protected sector of the followed air traffic way, such sector for which a security altitude is calculated and published on the navigation maps; and
- the air control actors to be able to ensure the safety of the airplane in distress and of surrounding aircrafts.

Now, as indicated hereinabove, regarding the management of the lateral trajectory upon a non automatic emergency descent, the crew implements simple actions, slaving the autopilot on a selected setpoint, meeting the short term need to deviate from the initial lateral trajectory. Similarly, for aircrafts being already provided with automated systems, managing the lateral trajectory only meets the initial requirement of deviating from the trajectory.

Consequently, none of the usual solutions was able to provide and take into account automatically a lateral trajectory able to meet the different operational constraints of an emergency descent maneuver, and this, whatever the initial situation.

The present invention aims at solving these drawbacks. It relates to an automatic management method of a lateral trajectory of an aircraft upon an emergency descent, said aircraft having to be laterally guided along an initial lateral trajectory.

SUMMARY OF THE INVENTION

To this end, according to this invention, said method is remarkable in that, upon triggering the emergency descent, automatically:
- a value of lateral offset is determined being lower than a maximum value and being different from a full value of a few nautical miles (NM); said maximum value being defined so as to ensure that the aircraft stays within the protected sector of the air traffic way, as described hereinunder; and
- this value of lateral offset is used for generating an offset setpoint being defined with respect to said initial lateral trajectory and allowing to form an setpoint lateral trajectory that should be laterally followed by the aircraft upon the emergency descent.

Thus, the method according to this invention allows the lateral setpoint to be modified automatically upon a failure leading to an initiation of the emergency descent while taking into account the initially followed lateral trajectory. The thus obtained setpoint trajectory has the advantage, as set forth hereinunder, of meeting the operational and regulatory requirements inherent to carrying out an emergency descent, including in the case where the crew lost consciousness as a result of the decompression of the cabin and the cockpit.

Said lateral offset value could be determined in different ways within the scope of the present invention. To this end, advantageously:
- said lateral offset value could be a decimal number, having the decimal equal to 5; or
- it could also depend on a segment of a flight plan to be followed. Thus, as soon as the flight is prepared, some constraints could be taken into consideration, specific to the contemplated flight for defining the most appropriate strategy, in the case of an emergency descent; or even
- it can be determined randomly. This allows to considerably reduce the probability that the selected value is common to several aircrafts flying along the same air traffic way.

In a first embodiment, it is considered that the aircraft is laterally guided directly along the initial lateral trajectory (included in the managed mode) upon the initiation of the emergency descent. In this first embodiment, advantageously, said offset setpoint is equal to said value of lateral offset, to which a predetermined offset side is added, preferably the right side.

The offset side refers to the right side or the left side, in the direction of which the aircraft is deviated from the value of lateral offset being considered.

Moreover, in a second embodiment, it is considered that the aircraft is laterally guided (including in the managed mode) in parallel with the initial lateral trajectory, being laterally offset by an initial value of offset on one side, referred to as the initial side. Such an initial offset could be implemented, for example, in order to avoid an area of meteorological phenomena or dangerous slipstream turbulences, being located along the air traffic way being followed, or even when the crew applies a strategic lateral offset procedure.

In this second embodiment, upon initiating or triggering the emergency descent, advantageously:
- the sum of said value of lateral offset and said value of initial offset is calculated; and
- as the offset setpoint, the minimum value is selected between said sum and an auxiliary maximum value (allowing to ensure that the aircraft stays within the protected sector of the air traffic way), to said offset setpoint is associated an offset side corresponding to said initial side (so as to avoid the aircraft having to cross the central axis of the air traffic way where the density of the traffic is the highest).

Moreover, in a particular embodiment:
- if said initial lateral trajectory is a managed trajectory, the aircraft is guided along the setpoint trajectory, being determined as described hereinabove; and
- if said initial lateral trajectory is a selected trajectory, the aircraft is guided along said selected trajectory. This type of navigation is generally used by the crew for a short term management of the flight, and this selected mode of guidance is thus generally temporary. The reasons for which a crew uses a selected mode of guidance instead of a managed mode of guidance could be multiple: instructions from the air control, meteorological avoidance, etc.

The present invention therefore allows meeting the operational and regulatory requirements inherent to carrying out an emergency descent, including in the case where the crew lost consciousness as a result of the decompression of the cabin and the cockpit. It more specifically allows:
- to meet the need to deviate from the central axis of the air traffic way being followed and to thus minimize, upon the descent, the probability of a conflict along the same air traffic way;
- to continue to take into account different flight constraints, being considered by the crew until that point (avoidance of areas of turbulences or dangerous meteorological phenomena);
- the aircraft to take energy upon the interception of the offset trajectory and to thereby improve the descent performances thereof;
- the air control actors to be able to ensure the safety of the aircraft in distress and of surrounding aircrafts (predictive trajectory with respect to the initial flight plan known to the control bodies);

to stay within the protected sector of the followed air traffic way, such sector for which a security altitude is calculated and published on the navigation maps; and the aircraft to continue the flight in parallel to the initial itinerary, along which the crew took care to check, upon the flight preparation, that the deviating grounds able to receive the aircraft could be reached in the case of a depressurization (regulatory operational requirement).

The above mentioned method according to this invention, for automatically managing a lateral trajectory of an aircraft upon an emergency descent of an aircraft, is adapted to any type of partially or completely automated emergency descent method.

However in a preferred application, this method is used for determining, as a lateral setpoint, an offset setpoint in an automatic controlling process for an emergency descent of an aircraft wherein the following successive operations are carried out:

a) a set of vertical setpoints is automatically determined comprising:
  a target altitude setpoint representing an altitude to be reached by the aircraft at the end of the emergency descent; and
  a target speed setpoint representing a speed that the aircraft should respect upon the emergency descent;

b) a set of lateral setpoints is automatically determined, representing a lateral maneuver to be carried out upon the emergency descent; and c) the aircraft is automatically guided so that it simultaneously respects said set of vertical setpoints and said set of lateral setpoints until reaching said target altitude setpoint.

The present invention further relates to a device for automatically managing a lateral trajectory of an aircraft, in particular of a transport airplane, upon an emergency descent.

According to this invention, the device is remarkable in that the device includes:

a lateral offset determination device for automatically determining, upon triggering the emergency descent, a value of lateral offset being lower than a maximum value and being different from a full value of nautical miles; and an offset setpoint determination device for using automatically this value of lateral offset for generating an offset setpoint being defined with respect to said initial lateral trajectory and allowing to form a setpoint lateral trajectory that should be laterally followed by the aircraft upon the emergency descent.

The present invention also relates to a system for automatically controlling an emergency descent of an aircraft, comprising a device of the previous type for automatically managing a lateral trajectory of the aircraft upon such an emergency descent.

The present invention further relates to an aircraft, in particular a transport airplane, being provided with a device and/or a system such as mentioned hereinabove.

BRIEF DESCRIPTION OF THE DRAWINGS

The FIGS. of the appended drawing will better explain how this invention can be implemented. In these FIGS., like reference numerals relate to like components.

DETAILED DESCRIPTION

Figure 1:
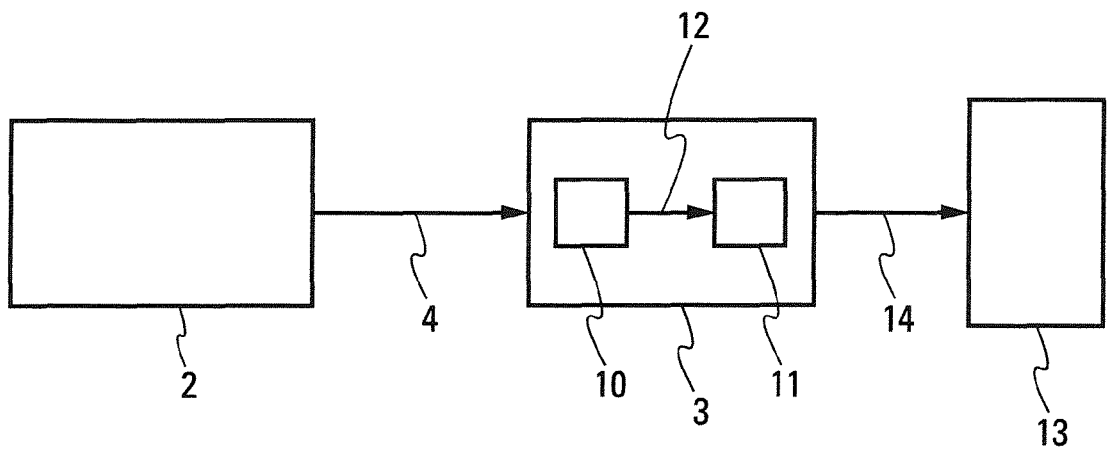
FIG. 1 is a block diagram illustrating a device according to this invention.

The device 1 according to this invention being schematically shown on FIG. 1 is intended to automatically manage a lateral trajectory of an aircraft AC, in particular of a transport airplane, upon an emergency descent. A lateral trajectory means the projection on a horizontal plane of the flight trajectory being followed by the aircraft AC. It is considered that the aircraft AC is initially guided, usually, as a function of an initial lateral trajectory TL0.

According to this invention, the device 1 includes:

a lateral offset determination device 2 for automatically determining, upon triggering the emergency descent, a value of lateral offset DL being lower than a maximum value DLmax, preferably 5 NM, and being different from a full integer value of nautical miles (1.0, 2.0, 3.0, . . . NM). The maximum value DLmax is defined so as to ensure that the aircraft AC stays in a protected sector of the air traffic way, as set forth hereinunder; and an offset setpoint determination device 3 being connected via a link 4 to the lateral offset determination device 2 and being formed so as to use, automatically, the value of lateral offset DL so as to generate an offset setpoint CD1, CD2 being defined with respect to the initial lateral trajectory TL0 and allowing to form a lateral trajectory of setpoint TC1, TC2 that should be laterally followed by the aircraft AC upon the emergency descent.

Thus, the device 1 according to this invention allows the lateral setpoint to be modified automatically upon a failure triggering the emergency descent while taking into account the initially followed lateral trajectory TL0. The thus obtained setpoint trajectory TC 1, TC2 has the advantage, as set forth hereinunder, of meeting the operational and regulatory requirements being inherent to carrying out an emergency descent, including in the case where the crew lost consciousness as a result of a decompression of the cabin and of the cockpit.

The lateral offset determination device 2 can determine the value of lateral offset DL in various ways within the scope of the present invention. In particular:

the lateral offset value DL could be chosen equal to a decimal number, having the tenths position of the decimal equal to 5. As the smallest pitch existing on the flight managing systems is currently 1, such a value, for example, 2.5 NM, allows, on the one hand, to overcome the risks of collision with the other aircrafts flying along the air traffic way and the aircrafts flying offset with respect to the latter, and, on the other hand, to carry out the emergency descent, within the protected sector of this air traffic way; or the value of lateral offset DL can depend on a segment of the flight plan to be followed. Thus, as soon as the flight is prepared, the crew can take into consideration some constraints being specific to the contemplated flight for defining the most appropriate strategy, in the case of an emergency descent; or even the value of lateral offset DL can be determined randomly. In this case, preferably, the value of lateral offset DL is defined as a random multiple of the minimum pitch of offset that the aircrafts are able to carry out (considering, for instance, a pitch of 0.1 NM in a near future). This allows to considerably reduce the probability that the selected value is common to several aircrafts flying along the same air traffic way.

Figure 2:
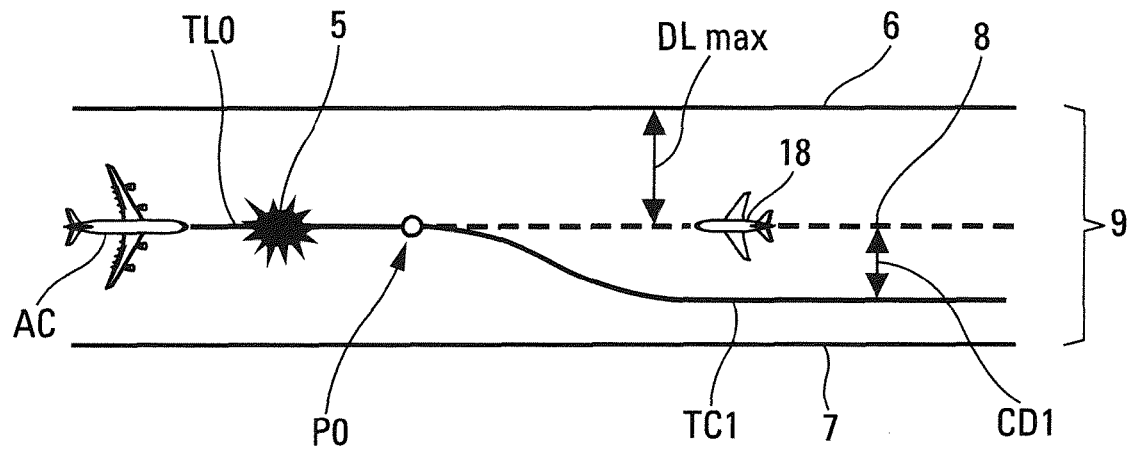
FIGS. 2 and 3 schematically show the flight of an aircraft in a horizontal plane and allow explaining the management of the lateral trajectory upon an emergency descent, in two different situations.

In a first embodiment shown on FIG. 2, the aircraft AC is laterally guided directly along the initial lateral trajectory TL0 (included in the managed mode) upon triggering the emergency descent in a position P0, as a result of a failure being emphasized by a symbol 5. The lateral trajectory TL of the aircraft AC is initially slaved to the active flight plan of the flight management system (managed lateral trajectory) and no offset is initially inserted. Such a situation could be considered as the nominal case in a cruising phase.

This FIG. 2 further shows the lateral limits 6 and 7 of the protected sector 9 (for which, more specifically, a security altitude is generally calculated and published on navigation maps) of the air traffic way to be followed. The initial lateral trajectory TL0 is therefore defined according to the central axis 8 of this protected sector 9. The maximum value DLmax is equal (or optionally lower than) to the distance between the central axis 8 and any one of the lateral limits 6 and 7.

In this first embodiment, the offset setpoint determination device 3 determines an offset setpoint CD1 (with respect to the central axis 8) being equal to the value of lateral offset DL (received from the lateral offset determination device 2), with which they associate a predetermined offset side, preferably the right side in the flight direction. Thereby, the lateral trajectory of setpoint TC1 is obtained, allowing the aircraft AC to avoid another aircraft A1 flying in the opposite direction along the central axis 8.

Upon triggering an automated emergency descent function, to be explained hereinunder, the offset setpoint CD1 to the right is automatically inserted in the active flight plan of the flight management system. The direction of the automatically inserted offset corresponds to the operational practices in service, that requires that a lateral offset occurs to the right by default.

As set forth above, the value of lateral offset DL allows, on the one hand, to overcome the risks of collision with the other aircrafts A1 flying along the air traffic way and with the aircrafts flying offset with respect to the latter, and, on the other hand, to carry out the emergency descent within the protected sector 9 of this air traffic way.

Figure 3:
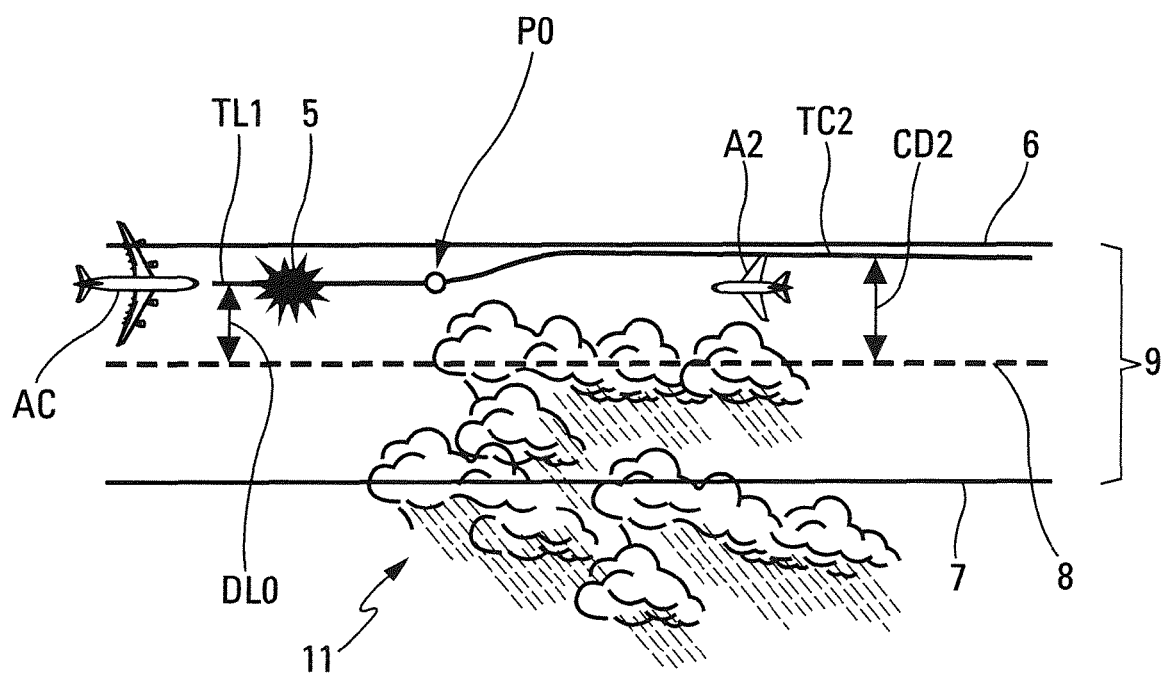

Moreover, in a second embodiment, shown on FIG. 3, the aircraft AC is laterally guided (including in the managed mode) according to a lateral trajectory TL1 being parallel to the initial lateral trajectory, defined according to the central axis 10, being laterally offset by an initial value of lateral offset DL0 on one side (referred to as the initial side). Such an initial offset could be implemented for avoiding an area 11 of meteorological phenomena. It could also be implemented to avoid an area of dangerous slipstream turbulences, being located along the air traffic way being followed, or even when the crew applies a strategic lateral offset procedure of the SLOP (<<Strategic Lateral Offset Procedure>>) type.

In such a case, it is considered that the lateral trajectory of the aircraft AC is slaved to the active flight plan of the flight management system (managed lateral trajectory), but that an offset DL0 has already been inserted in the latter.

In this second embodiment, the offset setpoint determination device 3 includes:
- an offset summing device 10 that, upon triggering the emergency descent, calculates the sum S of the value of lateral offset DL, received from the lateral offset determination device 2, and of the initial value of offset DL0; and
- an offset value comparison and selection device 11 being connected via a link 12 to the offset summing device 10 and selecting, as an offset setpoint CD2, the minimum value between the sum S and an auxiliary maximum value (allowing to ensure that the aircraft AC stays in the protected sector 9 of the air traffic way), preferably the value DLmax.

With this offset setpoint, the offset value comparison and selection device 11 associate an offset side corresponding to the initial side (so as to avoid the aircraft AC having to cross the central axis 8 of the air traffic way where the density of the traffic is the highest). In the example shown on FIG. 3, this side is the left side in the flying direction of the aircraft AC.

As an illustration, it is supposed that, in the example of FIG. 3, DLmax is equal to 4.5 NM and DL is equal to 2.5 NM. Supposing, in addition, that, in order to avoid the area 11 of dangerous meteorological phenomena, the crew obtained from the local air traffic control body, the authorization to fly in an offset of 3 NM (DL0) to the left, with respect to the central axis 8 of the air traffic way being followed. It is therefore very likely that the other aircrafts A2 flying along this same way would also have wanted to avoid the disturbed area 11 and they thus also fly in offset. Upon triggering an automatic emergency descent maneuver, the value of the offset is modified for taking into account the offset setpoint CD2 of 4.5 NM (4.5=Min (3+2.5; 4.5)) to the left.

Within the scope of the present invention, if the initial lateral trajectory TL0 is a managed trajectory, the aircraft AC is guided, upon triggering the emergency descent, along the setpoint trajectory TC1, TC2 being determined as set forth above.

Furthermore, in a particular embodiment, if the initial lateral trajectory is a selected trajectory, the aircraft AC is still guided along the selected trajectory, upon a failure occurring, such as a decompression of the cabin for instance. This type of navigation is generally used by the crew for a short term management of the flight, and this selected mode of guidance is thus generally temporary. The reasons for which a crew uses a selected mode of guidance instead of a managed mode of guidance could be multiple: instructions from the air control, meteorological avoidance, for instance. In such a case, no modification of the active flight itinerary of the flight management system is carried out upon triggering a function of emergency descent and the guidance upon the procedure of emergency descent occurs on the current heading (or the current itinerary).

The device 1 therefore allows meeting the operational and regulatory requirements being inherent to carrying out an emergency descent, including in the case where the crew lost consciousness as a result of the decompression of the cabin and of the cockpit. It more specifically allows:
- to meet the need to deviate from the central axis of the air traffic way being followed and to thus minimize, upon the descent, the probability of a conflict along the same air traffic way;
- to continue to take into account different flight constraints, being considered by the crew until that point (including avoidance of areas 11 of turbulences or dangerous meteorological phenomena);
- the aircraft AC to take energy upon the interception of the offset trajectory and to thereby improve the descent performances thereof;
- the air control actors to be able to ensure the safety of the airplane in distress and of surrounding aircrafts (predictive trajectory with respect to the initial flight plan known to the control bodies).

to stay within the protected sector 9 of the followed air traffic way, such sector 9 for which a security altitude is calculated and published on the navigation maps; and the aircraft AC to continue the flight in parallel to the initial itinerary, along which the crew took care to check, upon the flight preparation, that the deviating grounds able to receive the aircraft could be reached in the case of a depressurization (regulatory operational requirement).

The device 1 according to this invention further includes an indication device 13 being, for instance, connected to the offset setpoint determination device 3 through a link 14. Such an indication device 13 allows the pilots to visualize the modifications to the original active flight itinerary and to check the relevance thereof in the case where they remain conscious upon the maneuver.

The above mentioned device 1 according to this invention, for automatically managing a lateral trajectory of an aircraft AC upon an emergency descent is adapted to any type of partially or completely automated emergency descent system.

However, in a preferred application, such a device 1 is used to form a setpoint lateral trajectory TC1, TC2 that is used by a system 15 for automatically controlling an emergency descent of an aircraft AC.

Figure 4:
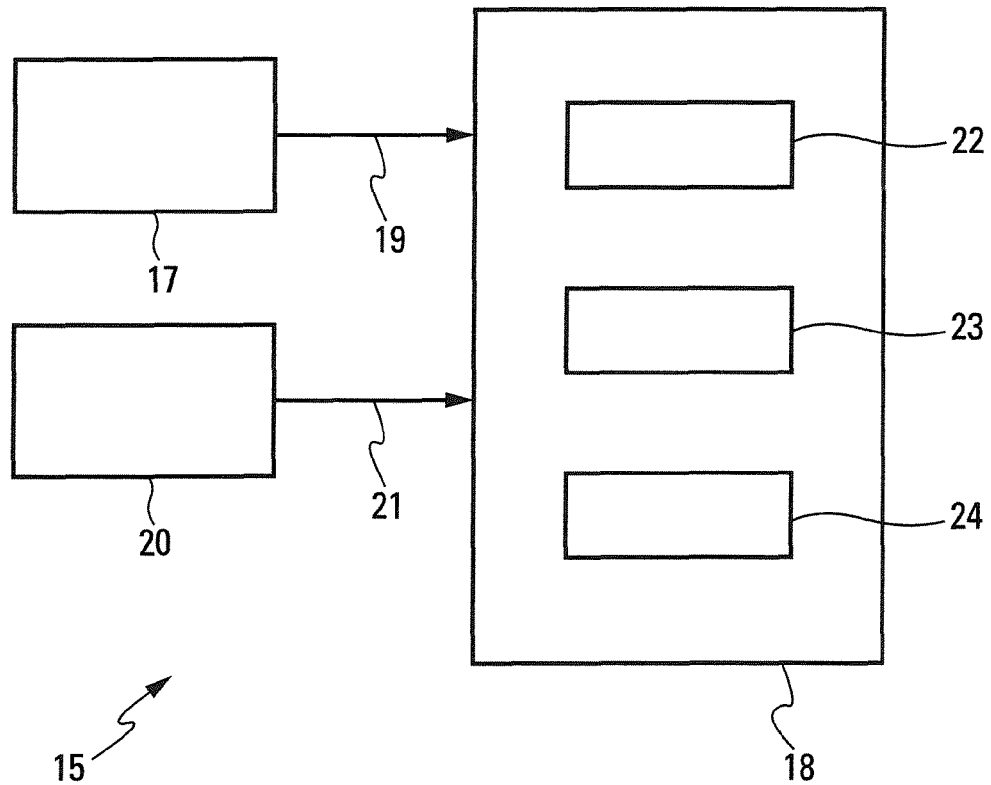
FIG. 4 shows the block diagram of a system for automatically controlling an emergency descent of an aircraft, comprising a device according to this invention.

Preferably, such a system 15 for automatically controlling an emergency descent is of the type including, such as shown on FIG. 4:

a triggering device 17 being able to trigger an automatic function of emergency descent;

a controller 18 being connected via a link 19 to the triggering device 17 and being formed so as to implement an automatic function of emergency descent, when it is triggered by the triggering device 17, automatically carrying out a longitudinal guidance, a lateral guidance and a control of the speed of the aircraft AC; and a disengaging device 20 being connected via a link 21 to the controller 18 and allowing to control a disengagement of au automatic function of emergency descent being carried out.

Such a function of automatic emergency descent thereby allows to bring the aircraft AC back to a breathable altitude (target altitude) and in a stabilized situation, with a view, more specifically, to reanimate (if necessary) the crew and the passengers and to continue the flight.

The controller 18 includes:

a vertical setpoint determination device 22 for automatically determining a set of vertical setpoints, more specifically, comprising:

the target altitude representing the altitude to be reached by the aircraft AC at the end of the emergency descent; and a target speed representing the speed that the aircraft AC should respect upon the emergency descent;

a lateral setpoint determination device 23 for automatically determining a set of lateral setpoints. Such a set represents a lateral maneuver to be carried out upon the emergency descent; and an aircraft guidance device 24 for automatically guiding the aircraft, upon triggering an automatic function of emergency descent, so that it simultaneously respects the set of vertical setpoints and the set of lateral setpoints, and this, until reaching the target altitude that it subsequently maintains, as soon as it has reached it.

Such a system 15 for automatically controlling an emergency descent could, more specifically, be similar to the system described in document FR-2,928,465 of the Applicant.

In such a case, the lateral setpoint determination device 23 includes the device 1 for automatically managing the lateral trajectory of the aircraft AC upon an emergency descent.

This system 15 could additionally have more specifically the following characteristics:

two types of arming could be contemplated: a voluntary arming and an automatic arming.

When the crew decides to carry out an emergency descent as a result of a depressurization, a fire alarm or any other reason, they have the possibility to arm the function actuating a dedicated press-button. A logic allows to validate such an arming condition as a function, more specifically, of the current altitude of the aircraft AC.

The automatic arming is linked to a depressurization event. It occurs when some criteria involving the air pressure or the variation of the air pressure inside the cabin are met.

The arming of the function always precedes triggering thereof;

the crew keeps at any time the possibility to manually disarm the function, whatever the type of (voluntary or automatic) arming;

two types of triggering are possible as a function of the arming that has preceded.

Subsequently to a voluntary arming, the triggering only occurs once the air brakes are completely implemented by the crew.

On the other hand, if the arming has been automatic, the triggering also occurs automatically at the end of a count-down initiated upon the arming, if the crew has not reacted by the end thereof. However, if, following a procedure, the crew completely implements the air brakes before the end of the count-down, triggering the function is anticipated with respect to the automatic triggering;

when the function of automatic emergency descent is triggered, the guidance and the control of the speed of the aircraft occur in the vertical and the lateral planes as follows:

in the vertical plane, the speed to be adopted for carrying out the automatic emergency descent is selected by default by the automatism, so as to minimize the descent time. The crew could freely adjust such a speed upon the maneuver of descent, in order to take into account possible structure damages, and this, without disengaging the function;

the lateral maneuver, carried out simultaneously with the longitudinal maneuver, aims at deviating the aircraft AC from the current itinerary so as to avoid meeting other aircrafts flying on the same itinerary, but at lower altitudes;

getting out of the automatic emergency descent coincides with the capture, then the maintain of the targeted altitude upon the maneuver; and upon the automated maneuver of emergency descent, the crew can at any time take over on the automatism using usual means: manual action on the joystick, triggering a new mode of guidance of the aircraft AC, disconnection button, adjustment of the speed or of the heading, etc.

The invention claimed is:

1. A method for automatically managing a lateral trajectory of an aircraft upon triggering of an emergency descent, the aircraft moving along an initial lateral trajectory that is parallel or concurrent with a central axis of a protected sector of an air traffic way defining a flight plan between a departure point and a destination of the aircraft, the protected sector including a space defined between a lateral offset maxmimum on either side of the central axis, the method comprising the following steps, performed automatically after triggering the emergency descent:
- (1) determining a value of lateral offset that is lower than the lateral offset maximum and that is not from a full integer value of nautical miles;
- (2) generating an offset setpoint by using the value of lateral offset determined in step (1), the offset setpoint being defined with respect to the central axis of the protected sector and being used to form a new setpoint lateral trajectory that should be laterally followed by the aircraft during and after the emergency descent, the generating step further comprising:
  - (2a) calculating a sum of the value of lateral offset determined in step (1) and an initial value of lateral offset defined between the central axis of the protected sector and the initial lateral trajectory; and
  - (2b) selecting the offset setpoint by setting the offset setpoint equal to a smaller of the sum calculated in step (2a) and the lateral offset maximum; and
- (3) operating the aircraft to move the aircraft to the offset setpoint, generated during step (2), during the emergency descent and follow the new setpoint lateral trajectory after the emergency descent, thereby allowing the aircraft to carry out the emergency descent while remaining in the protected sector and also to maintain a trajectory substantially parallel to the central axis of the protected sector.

2. The method according to claim 1, wherein the value of lateral offset is determined in step (1) to be a decimal number, having the tenths position of the decimal equal to 5.

3. The method according to claim 1, wherein the value of lateral offset depends on a segment of the flight plan to be followed.

4. The method according to claim 1, wherein step (1) further comprises:
determining the value of lateral offset randomly.

5. The method according to claim 1, wherein the initial lateral trajectory is concurrent with the central axis of the protected sector when triggering the emergency descent, such that the offset setpoint is selected in step (2b) to be equal to the value of lateral offset.

6. The method according to claim 1, wherein the initial lateral trajectory is parallel to and laterally offset by the initial value of lateral offset from the central axis of the protected sector when triggering the emergency descent, such that the sum calculated in step (2a) is larger than the initial value of lateral offset and tends to move the aircraft farther away from the central axis of the protected sector, which may be a high-traffic area within the protected sector.

7. The method according to claim 1, wherein step (3) further comprises:
if the initial lateral trajectory is a managed trajectory not actively selected by a crew of the aircraft, the aircraft is guided in step (3) along the new setpoint lateral trajectory; and
if the initial lateral trajectory is a selected trajectory that was actively selected by the crew of the aircraft, the aircraft is guided in step (3) along the selected trajectory rather than the new setpoint lateral trajectory.

8. The method of claim 1, further comprising:
alerting a crew of the aircraft with an indicator device the new setpoint lateral trajectory formed in step (2) such that the crew may review the new setpoint lateral trajectory.

9. An automatic controlling process of an emergency descent of an aircraft wherein the following successive operations are carried out:
performing the method of claim 1;
- (a) automatically determining a set of vertical setpoints including a target altitude setpoint representing an altitude to be reached by the aircraft at the end of the emergency descent; and a target speed setpoint representing a speed that the aircraft should respect upon the emergency descent;
- (b) automatically determining a set of lateral setpoints, representing a lateral manoeuvre to be carried out during and after the emergency descent, the set of lateral setpoints including the offset setpoint determined using the method of claim 1; and
- (c) automatically guiding the aircraft during step (3) of the method of claim 1 so that the aircraft simultaneously respects the set of vertical setpoints and the set of lateral setpoints until reaching the target altitude setpoint.

10. The process of claim 9, further comprising:
triggering the emergency descent automatically as a result of a depressurization within the aircraft or based on manual commands from a crew of the aircraft; and
deactivating the emergency descent and the new setpoint lateral trajectory when the crew of the aircraft has determined that an event triggering the emergency descent is no longer an active concern at the aircraft.

11. An automatic management device for managing a lateral trajectory of an aircraft upon triggering of an emergency descent, the aircraft moving along an initial lateral trajectory that is parallel or concurrent with a central axis of a protected sector of an air traffic way defining a flight plan between a departure point and a destination of the aircraft, the protected sector including a space defined between a lateral offset maximum on either side of the central axis, the device comprising:
a lateral offset determination device for automatically determining, upon triggering the emergency descent, a value of lateral offset that is lower than the lateral offset maximum and that is not a full integer value of nautical miles;
an offset setpoint determination device linked to the lateral offset determination device for using the value of lateral offset to generate an offset setpoint being defined with respect to the central axis of the protected sector and being used to form a new setpoint lateral trajectory that should be laterally followed by the aircraft during and after the emergency descent, wherein the offset setpoint determination device further comprises:
an offset summing device configured to calculate a sum of the value of lateral offset and an initial value of lateral offset defined between the central axis of the protected sector and the initial lateral trajectory; and
an offset value selection and comparison device that selects the offset setpoint by setting the offset setpoint equal to a smaller of the sum and the lateral offset maximum; and
an aircraft guidance device linked to the offset setpoint determination device and configured to operate the aircraft to move the aircraft to the offset setpoint during the emergency descent and follow the new setpoint lateral trajectory after the emergency descent, thereby allowing the aircraft to carry out the emergency descent while remaining in the protected sector and also to maintain a trajectory substantially parallel to the central axis of the protected sector.

12. The device of claim 11, further comprising:
an indication device configured to alert a crew of the aircraft of the new setpoint lateral trajectory such that the crew may review the new setpoint lateral trajectory.

13. A system for automatically controlling an emergency descent of an aircraft, comprising:
a vertical setpoint determination device 22 for automatically determining a set of vertical setpoints including a target altitude setpoint representing an altitude to be reached by the aircraft at the end of the emergency descent; and a target speed setpoint representing a speed that the aircraft should respect upon the emergency descent; and
a lateral setpoint determination device for automatically determining a set of lateral setpoints, representing a lateral manoeuvre to be carried out upon the emergency descent, the lateral setpoint determination device including the automatic management device of claim 9;
wherein the aircraft guidance device automatically guides the aircraft so that the aircraft simultaneously respects the set of vertical setpoints and the set of lateral setpoints until reaching the target altitude setpoint.

14. The system of claim 13, wherein the vertical setpoint determination device, the lateral setpoint determination device, and the aircraft guidance system are each contained in a controller, and the system further comprises:
a triggering device coupled to the controller and configured to actuate the emergency descent automatically as a result of a depressurization within the aircraft or based on manual commands from a crew of the aircraft; and
a disengaging device coupled to the controller and configured to deactivate the emergency descent and the new setpoint lateral trajectory when the crew of the aircraft has determined that an event triggering the emergency descent is no longer an active concern at the aircraft.

* * * * *